(12) United States Patent
Duerrschmid et al.

(10) Patent No.: US 12,195,088 B2
(45) Date of Patent: Jan. 14, 2025

(54) CHASSIS SUBFRAME OF A TWO-TRACK VEHICLE

(71) Applicant: Bayerische Motoren Werke Aktiengesellschaft, Munich (DE)

(72) Inventors: Thomas Duerrschmid, Munich (DE); Fabian Mueller, Munich (DE); Dominik Scheuerer, Herrngiersdorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/028,665

(22) PCT Filed: Sep. 29, 2021

(86) PCT No.: PCT/EP2021/076774
§ 371 (c)(1),
(2) Date: Mar. 27, 2023

(87) PCT Pub. No.: WO2022/073818
PCT Pub. Date: Apr. 14, 2022

(65) Prior Publication Data
US 2023/0331306 A1    Oct. 19, 2023

(30) Foreign Application Priority Data
Oct. 5, 2020   (DE) .................. 10 2020 125 974.3

(51) Int. Cl.
*B62D 29/00*    (2006.01)
*B62D 21/11*    (2006.01)

(52) U.S. Cl.
CPC ............ *B62D 21/11* (2013.01); *B62D 29/005* (2013.01)

(58) Field of Classification Search
CPC ...... B62D 21/11; B62D 29/005; B62D 65/12; B62D 25/2018
See application file for complete search history.

(56) References Cited

U.S. PATENT DOCUMENTS

| | | | |
|---|---|---|---|
| 6,623,020 B1 * | 9/2003 | Satou | B62D 21/11 280/124.109 |
| 7,360,621 B2 * | 4/2008 | Komiya | B62D 21/11 180/312 |

(Continued)

FOREIGN PATENT DOCUMENTS

| | | | |
|---|---|---|---|
| CN | 110510001 A | * | 11/2019 |
| CN | 111216793 A | | 6/2020 |

(Continued)

OTHER PUBLICATIONS

DE 102012215102 A1 machine translation from espacenet.com (Year: 2024).*

(Continued)

*Primary Examiner* — Frank B Vanaman
*Assistant Examiner* — Maxwell L Meshaka
(74) *Attorney, Agent, or Firm* — Crowell & Moring LLP

(57) ABSTRACT

A chassis subframe of a two-track vehicle, includes: at least two tubular longitudinal members, which are oriented at least approximately in a vehicle longitudinal direction, wherein the at least two longitudinal members each comprise an upper shell and a lower shell, wherein the upper shell and the lower shell are produced in a sheet-metal deformation process and are joined by way of a joining process to form a respective one of the tubular longitudinal members, at least one transverse member, which is oriented at least approximately in a vehicle transverse direction and which connects the two longitudinal members to one another, at least one attachment lug, wherein at least one wheel-controlling link for connecting a respective wheel of (Continued)

the vehicle to the chassis subframe is attachable to in each case at least one attachment lug on a respective longitudinal member. The lower shell and/or the upper shell of a respective longitudinal member comprises at least one support plate produced in a sheet-metal deformation process, which support plate is arranged at least approximately in a horizontal plane and so as to project from the longitudinal member at least approximately in a vehicle transverse direction, wherein at least a part of the attachment lug is attached to the support plate.

16 Claims, 2 Drawing Sheets

(56) References Cited

U.S. PATENT DOCUMENTS

| | | | | |
|---|---|---|---|---|
| 9,090,287 | B2* | 7/2015 | Ezzat | B62D 25/00 |
| 9,238,394 | B2* | 1/2016 | Leibl | B60G 21/005 |
| 9,789,911 | B2* | 10/2017 | Bendiks | B62D 25/06 |
| 10,689,034 | B2* | 6/2020 | Schmalzrieth | B62D 21/02 |
| 10,836,433 | B2* | 11/2020 | Noguchi | B62D 21/11 |
| 11,142,249 | B2* | 10/2021 | Kawai | B62D 21/155 |
| 11,505,250 | B2* | 11/2022 | Jo | B62D 21/11 |
| 11,718,352 | B2* | 8/2023 | Fekete | B62D 25/082 296/187.09 |
| 11,752,822 | B1* | 9/2023 | Leith | B60G 15/067 280/680 |
| 2005/0200093 | A1* | 9/2005 | Komiya | B62D 21/11 280/124.109 |
| 2008/0048409 | A1 | 2/2008 | Takahashi | |
| 2008/0258450 | A1 | 10/2008 | Fujiki et al. | |
| 2009/0212548 | A1* | 8/2009 | Frasch | B62D 21/11 280/785 |
| 2014/0197664 | A1* | 7/2014 | Ezzat | B62D 29/005 296/193.01 |
| 2014/0232143 | A1 | 8/2014 | Renner et al. | |
| 2014/0361582 | A1* | 12/2014 | Franzke | B62D 21/11 228/101 |
| 2015/0014955 | A1* | 1/2015 | Leibl | B62D 21/11 280/124.107 |
| 2015/0166105 | A1 | 6/2015 | Zander et al. | |
| 2015/0353140 | A1* | 12/2015 | Bendiks | B62D 29/008 296/210 |
| 2018/0201322 | A1* | 7/2018 | Schmalzrieth | B62D 21/02 |
| 2019/0276079 | A1* | 9/2019 | Zuber | B62D 21/02 |
| 2019/0367098 | A1* | 12/2019 | Miyake | B62D 29/005 |
| 2020/0102011 | A1 | 4/2020 | Noguchi | |
| 2020/0216116 | A1 | 7/2020 | Backulja | |
| 2020/0307704 | A1* | 10/2020 | Kawai | B62D 21/11 |
| 2021/0354758 | A1* | 11/2021 | Jo | B62D 21/11 |
| 2022/0135130 | A1* | 5/2022 | Kawai | B62D 21/09 280/784 |
| 2022/0135135 | A1* | 5/2022 | Kawai | B62D 21/155 296/187.09 |
| 2022/0324515 | A1* | 10/2022 | Hashida | B60G 7/02 |
| 2022/0388577 | A1* | 12/2022 | Fekete | B62D 21/152 |
| 2023/0234437 | A1* | 7/2023 | Czajkowski | B62D 21/155 180/267 |
| 2023/0242186 | A1* | 8/2023 | Kondo | B62D 29/005 296/193.07 |
| 2023/0303173 | A1* | 9/2023 | Hochapfel | B62D 21/155 |
| 2023/0331306 | A1* | 10/2023 | Duerrschmid | B62D 29/005 |
| 2023/0347988 | A1* | 11/2023 | Fekete | B62D 21/152 |

FOREIGN PATENT DOCUMENTS

| | | | | |
|---|---|---|---|---|
| CN | 111634334 A | * | 9/2020 | B60G 15/068 |
| CN | 114013509 A | * | 2/2022 | |
| CN | 115352527 A | * | 11/2022 | |
| CN | 116331353 A | * | 6/2023 | |
| DE | 196 12 885 A1 | | 10/1997 | |
| DE | 10 2011 085 383 A1 | | 5/2013 | |
| DE | 10 2012 215 098 A1 | | 5/2014 | |
| DE | 10 2012 215 102 A1 | | 5/2014 | |
| DE | 10 2017 115 248 A1 | | 1/2019 | |
| DE | 102019003247 A1 | * | 11/2019 | |
| EP | 4026757 A1 | * | 7/2022 | B62D 21/11 |
| FR | 3093981 A1 | * | 9/2020 | B62D 21/11 |
| WO | WO-2020147963 A1 | * | 7/2020 | B62D 21/11 |

OTHER PUBLICATIONS

International Search Report (PCT/ISA/210) issued in PCT Application No. PCT/EP2021/076774 dated Jan. 24, 2022 with English translation (six (6) pages).

German-language Written Opinion (PCT/ISA/237) issued in PCT Application No. PCT/EP2021/076774 dated Jan. 24, 2022 (nine (9) pages).

German-language Search Report issued in German Application No. 10 2020 125 974.3 dated Aug. 19, 2021 with partial English translation (11 pages).

* cited by examiner

CHASSIS SUBFRAME OF A TWO-TRACK VEHICLE

BACKGROUND AND SUMMARY

The invention relates to a chassis subframe of a two-track vehicle.

With respect to the prior art, reference is made by way of example to DE 10 2011 085 383 A1. A chassis subframe, for example a front axle or a rear axle carrier, of a two-track motor vehicle usually comprises at least two longitudinal beams which are oriented parallel to one another and at least one transverse beam which connects the two longitudinal beams to one another.

Attaching elements for attaching wheel controlling links, which links connect the chassis subframe to a vehicle wheel, are arranged on the respective longitudinal or transverse beams which, apart from that, are usually of tubular configuration. Attaching elements of this type are usually connected to the respective chassis subframe part subsequently, by way of welding, for example, and are also known from the prior art as what are known as link lugs. Here, as is known, the links are connected to the link lugs by way of a screw connection. Here, the link exerts a force (tensile force or compressive force) on the chassis subframe in the link direction (in particular, in the vehicle transverse direction or combined in the vehicle longitudinal and transverse direction).

The force flow in the chassis subframe has to be forwarded via the clamping action of the screw connection from the link bearing into the link lugs on the chassis subframe and from there within the chassis subframe into the vehicle body or other chassis components.

In order to achieve the rigidity aims with regard to the driving dynamics and acoustic requirements and the strength aims (in particular, with regard to the service life), these lugs should have as rigid an attachment to the chassis subframe as possible, and a homogeneous stress distribution which is as low as possible should be achieved without extreme points. This requirement applies both to the individual parts of the chassis subframe and to the weld seams which connect them.

This subsequent attachment of the link lugs by way of a welding method has the disadvantage that often an unfavorable force flow can be introduced into the "soft" lateral membrane of a longitudinal beam as a result of the position of the attachments of the link lugs. Furthermore, inhomogeneous stresses which in turn have a negative effect on the service life of the axle and the chassis subframe arise to some extent, as a result of different weld seams and weld seam directions.

It is known from the prior art for a chassis subframe or its individual constituent parts to be produced from solid material using forming methods, for example in what is known as an internal pressure reshaping method (IPR for short).

It is likewise known for a complete chassis subframe to be produced by joining an upper shell and a lower shell to form a hollow overall construction by way of different joining methods such as, for example, welding.

It is known from DE 10 2011 085 383 A1, for example, for a chassis subframe of a vehicle to be assembled in a manner which consists of an upper shell and a lower shell each formed from carbon fiber-reinforced plastic material and for a hollow body to be formed in this way. Here, the upper shell and the lower shell comprise via metallic insert parts, at least portions of which are laminated into these shell parts and by way of which the shells are screwed to one another. A laminated-in insert part of this type can at the same time be configured for attaching an attachment component such as, for example, a wheel controlling link.

Attachment elements or link lugs of this type which have already been integrated into the chassis subframe or into the longitudinal beams or transverse beams have the disadvantage that the link position can no longer be influenced after the chassis subframe assembly. Then, neither what is known as the jaw width (which represents the spacing of the lugs) nor the position can be adjusted in the direction of the screw connection axis.

It is therefore an object of the invention to provide a chassis subframe of a vehicle which solves the abovementioned problems of the prior art.

The object is achieved by way of a chassis subframe of a two-track vehicle with the features of the independent claims. Advantageous refinements and developments are the subject of the dependent claims.

A chassis subframe of a two-track vehicle is proposed which comprises at least two tubular longitudinal beams which are oriented at least approximately in the vehicle longitudinal direction.

The longitudinal beams are therefore configured as a tubular hollow body. Here, a longitudinal beam of this type is formed in each case from an upper shell and a lower shell, which two shells are joined by a joining method to form the known hollow body. The two shells are particularly preferably welded to one another to form a respective longitudinal beam. Here, the upper shell is oriented in the direction of the vehicle interior compartment in the installed state in the vehicle as viewed in the vehicle vertical direction, while the lower shell is oriented at least predominantly in the direction of the road.

The upper shell and the lower shell themselves are preferably configured from an aluminum or steel, and are produced using a sheet metal forming method.

A split longitudinal beam of this type, the shells of which are welded together after manufacture, enables a higher freedom of form and therefore an improved utilization of the cross section in contrast to what is known as an IPR method, in which the chassis subframe is produced in a finished state as a single-piece hollow component.

Furthermore, the chassis subframe comprises at least one transverse beam which is oriented at least approximately in the vehicle transverse direction and connects the two longitudinal beams to one another. The two longitudinal beams and the at least one transverse beam then together form, inter alia, a chassis subframe. The chassis subframe can be configured, for example, as a front axle carrier or rear axle carrier.

It is provided that at least one wheel controlling link for connecting a respective wheel of the vehicle to the chassis subframe is attached by way of in each case at least one attachment lug to a respective longitudinal beam.

The link can be, for example, a transverse link, a compression or tension strut, a longitudinal link, a crescent-shaped link or a guide link. Here, the link is preferably connected via a screw connection to the attaching lug (also called a link lug). Here, this connection further preferably takes place by way of a screw connection (for example, by means of a rubber bearing) which is configured at least approximately in the vehicle longitudinal direction.

An attaching lug or link lug of this type is preferably of two-part configuration here. In the case of a two-part configuration of this type, the link lug preferably comprises two attaching lugs which are spaced apart from one another in the vehicle longitudinal direction and project from the longitudinal beam at least approximately in the vehicle transverse direction. Here, these attaching lugs which project from the respective longitudinal beam at least approximately in the vehicle transverse direction are spaced apart from one another in the vehicle longitudinal direction (the spacing also being called a jaw width) in such a way that an end of a link can be plugged between the wing elements in an ideal manner without distortion stresses and can thus be connected without stress to the vehicle body.

The two attaching lugs are preferably attached to the respective longitudinal beam individually by way of a corresponding joining method, in particular a welding method. This individual attachment enables an adjustment capability of the jaw width up to the moment of link attachment.

As an alternative, it is also possible that only one attaching lug is provided which then has two wing elements which project from the longitudinal beam at least approximately in the vehicle transverse direction. The two wing elements are then spaced apart from one another in the vehicle longitudinal direction, with the result that an end of a link of the vehicle can be plugged between the lugs and can thus be connected to the chassis subframe. In the case of this alternative, the attaching lug is connected as a single-piece component to the longitudinal beam. Here, it is preferably connected to this longitudinal beam by way of a welding method.

The embodiment with two individual attaching lugs which are connected separately to the longitudinal beam has the advantage, in particular, that the above-addressed jaw width can be set and finely adjusted in a flexible manner for link attachment, in particular.

It is provided, furthermore, that the lower shell and the upper shell of a respective longitudinal beam comprise at least one support plate which is produced by the sheet metal forming method.

This support plate is arranged so as to project from the longitudinal beam at least approximately in a horizontal plane, at least substantially in the vehicle transverse direction. Within the context of the invention, a horizontal plane of this type addresses a plane which is configured at least approximately parallel to the road and which is defined by vehicle longitudinal direction vectors and vehicle transverse direction vectors. The support plate is preferably arranged as a flat and at least predominantly planar or plate-shaped metal sheet.

As has already been mentioned, the support plate can be either on the upper shell or on the lower shell. It is also possible, however, that the support plate is arranged both on the upper shell and on the lower shell.

Here, the support plate is a constituent part of the upper shell and/or lower shell, is produced during the sheet metal forming method of the upper shell and/or lower shell, and serves, in particular, to reinforce and support the link lugs.

The support plate particularly preferably extends from a surface of the longitudinal beam, which surface is oriented in the stated horizontal plane. For example, as viewed in the installed state of the chassis subframe in the vehicle, the support plate can project from that surface of the longitudinal beam which faces the road.

It is provided, furthermore, that at least one part of the attaching lug or of the two attaching lugs which are arranged on the longitudinal beam for receiving a link is attached to the support plate. Here, this attachment preferably takes place by way of a welded connection. Here, in each case one link lug or a wing element of the link lug (in the case of a single-part configuration) is particularly preferably connected to the support plate by a welded connection.

As a result, an optimized force flow from the link via the link lug into a rigid longitudinal tubular shell can be ensured. The attachment of the support plate to the longitudinal beam can be reinforced further, for example, via a shear field attachment.

It is further preferably provided here that the weld seam for connecting the attaching lug to the support plate runs at least substantially in the vehicle transverse direction, as viewed in the installed state of the chassis subframe in the vehicle.

As a result of an orientation of this type of the weld seams at least approximately in the vehicle transverse direction, the weld seams are oriented at least predominantly in the link direction or in the force action direction of the link (in particular, in the case of a transverse link) and are thus loaded mainly with shear stresses. As a result, the stresses in the weld seam are distributed homogeneously, and are not concentrated very highly at the weld seam end close to the link, as in the case of a seam which is directed transversely with respect to the link direction.

Furthermore, it is provided in one preferred embodiment of the invention that the link lug or the two link lugs lies/lie on the support plate in each case in the installed state in the vehicle, and is/are connected to the support plate in its/their rest position.

Furthermore, it is preferably provided that the support plate has a recess, into which a wheel controlling link can be introduced and in which it can be arranged.

It is provided in a further preferred embodiment of the invention that the link lug or the two link lugs per longitudinal beam is/are connected directly to the longitudinal beam or to the upper shell or the lower shell via a weld seam which runs in the vehicle transverse direction. It is further preferred here that the weld seam of the link lug is arranged on that surface of the longitudinal beam or of the upper shell or the lower shell of the longitudinal beam which is configured at least approximately in the stated horizontal plane and is oriented at least predominantly parallel to the road. This can be, for example, that surface of the lower shell which faces the road and/or that surface of the upper shell which faces the vehicle. An optimized force transmission of the link forces into the chassis subframe can be ensured by way of an attachment of this type of the link lugs to the longitudinal beam.

As an alternative or in addition to the stated embodiment of a chassis subframe, furthermore, a chassis subframe is proposed in which at least one transverse beam is produced by way of joining, in particular welding, of an upper shell produced by a sheet metal forming method to a lower shell produced by a sheet metal forming method. The transverse beam is then of tubular and hollow configuration and comprises at least one attaching lug for attaching a wheel controlling link or a tension strut or compression strut such as, for example, a hinged support for mounting or attaching a drive unit.

The transverse beam preferably comprises two attaching lugs which are arranged so as to project from the transverse beam at least approximately in the vehicle longitudinal direction, and are particularly preferably connected to the transverse beam by way of a welded connection.

Furthermore, it is provided in the case of the most recently proposed solution that the lower shell or upper shell of the transverse beam comprises a support plate which is produced by the sheet metal forming method and is arranged so as to project from the transverse beam at least approximately in a horizontal plane and at least approximately in the vehicle longitudinal direction. Here, as viewed in the vehicle vertical direction in the installed state in the vehicle, the upper shell is oriented in the direction of the vehicle interior compartment, while the lower shell is oriented at least predominantly in the direction of the road.

The support plate particularly preferably extends from a surface of the transverse beam, which surface is oriented in the stated horizontal plane. For example, as viewed in the installed state of the chassis subframe in the vehicle, the support plate can protrude from that surface of the transverse beam which faces the road.

The support plate can be either on the upper shell or on the lower shell. It is also possible, however, that the support plate is arranged both on the upper shell and on the lower shell.

Here, the support plate is a constituent part of the upper shell and/or lower shell, is produced during the sheet metal forming method of the upper shell and/or lower shell, and serves, in particular, for reinforcing and for supporting the link lugs. Here, at least one part of the attaching lug is attached to the support plate. The two preferred attaching lugs are particularly preferably both connected in each case to the support plate.

This part of the attaching lug is particularly preferably welded to the support plate. Here, the weld seam is particularly preferably oriented at least substantially in the vehicle longitudinal direction.

Furthermore, as in the case of the most recently proposed chassis subframe, it is preferably provided that the attaching lug is attached to a surface of the transverse beam, which surface lies or is configured in the horizontal plane. The attaching lug is preferably welded to the transverse beam (to the upper shell or the lower shell), at least one weld seam being configured at least substantially in the vehicle longitudinal direction.

A link, for example a wheel controlling link which is oriented at least approximately in the vehicle longitudinal direction, or a hinged support which is likewise oriented at least approximately in the vehicle longitudinal direction can then be arranged between the two preferred attaching lugs and can be connected to the transverse beam by means of a screw connection, for example. To this end, as viewed in the vehicle transverse direction, the attaching lugs are spaced apart from one another and are arranged next to one another. The stated screw connection is then preferably likewise arranged at least approximately in the vehicle transverse direction.

The support plate further preferably comprises a recess, through which or in which a stated link or a tension or compression strut (for example, a hinged support for attaching a drive unit) can be arranged and on the corners or edges of which the two preferred attaching lugs are arranged and lie on the support plate.

The proposed chassis subframes therefore enable a rigid attachment of a wheel controlling link or of other tension or compression struts to the chassis subframe of a vehicle, which ensures an optimized introduction and transmission of forces by way of a minimum number of weld seams and, as a result, also brings about a higher service life of the axle.

In addition to the stated chassis subframes, furthermore, a vehicle is proposed which comprises a chassis subframe of this type.

Apart from the claims and from the description, these and further features are also apparent from the drawings, it being possible for the individual features to be realized in each case per se on their own or in multiples in the form of sub-combinations in one embodiment of the invention and for embodiments which are advantageous and are patentable per se, for which protection is claimed here.

In the following text, the invention will be explained in further detail on the basis of one exemplary embodiment. Here, all of the features which are described in greater detail can be essential to the invention.

BRIEF DESCRIPTION OF THE DRAWINGS

FIG. 2 shows a three-dimensional view from the side, front and above.

FIG. 3 shows a three-dimension view from the side, front and below.

DETAILED DESCRIPTION OF THE DRAWINGS

Figure 2:
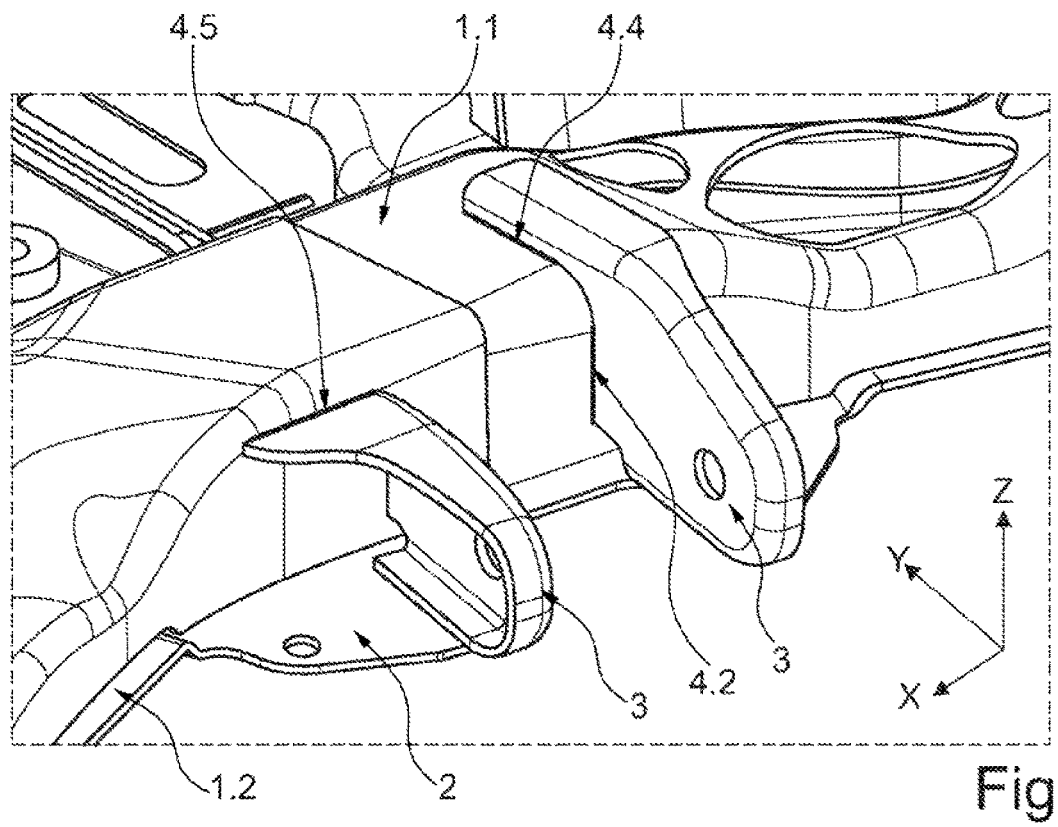
FIG. 2 shows an enlargement of the part of the chassis subframe from FIG. 1, in which exemplary link lugs and an exemplary support plate are indicated in more detail, where
Figure 3:
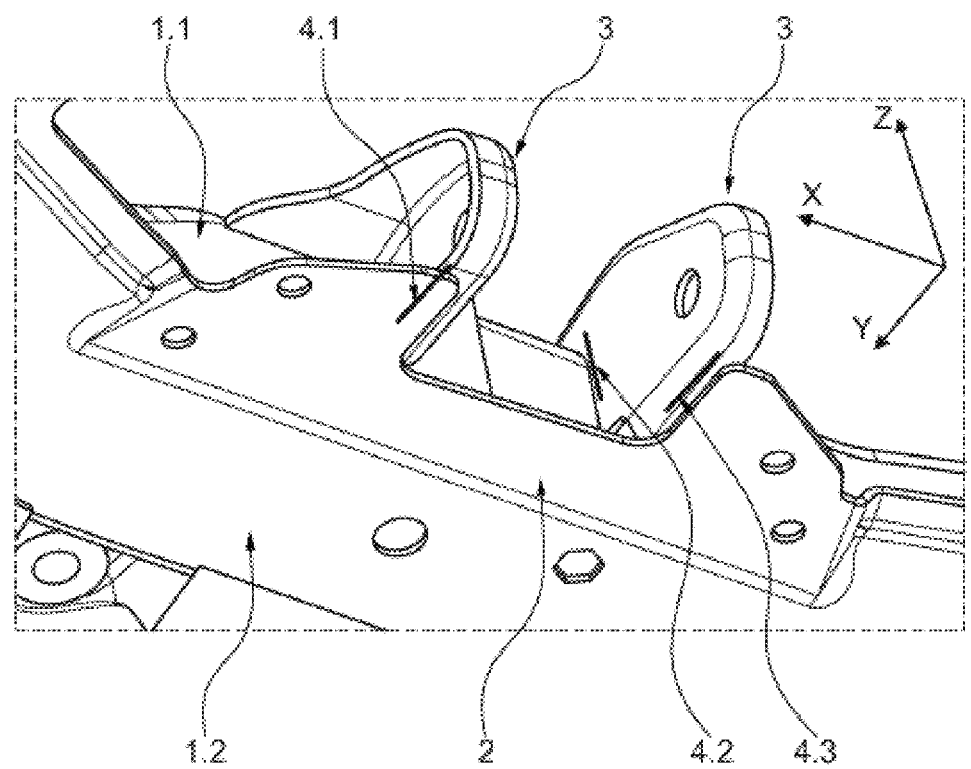
FIG. 3 shows an enlargement of the part of the chassis subframe from FIG. 1, where
Figure 4:
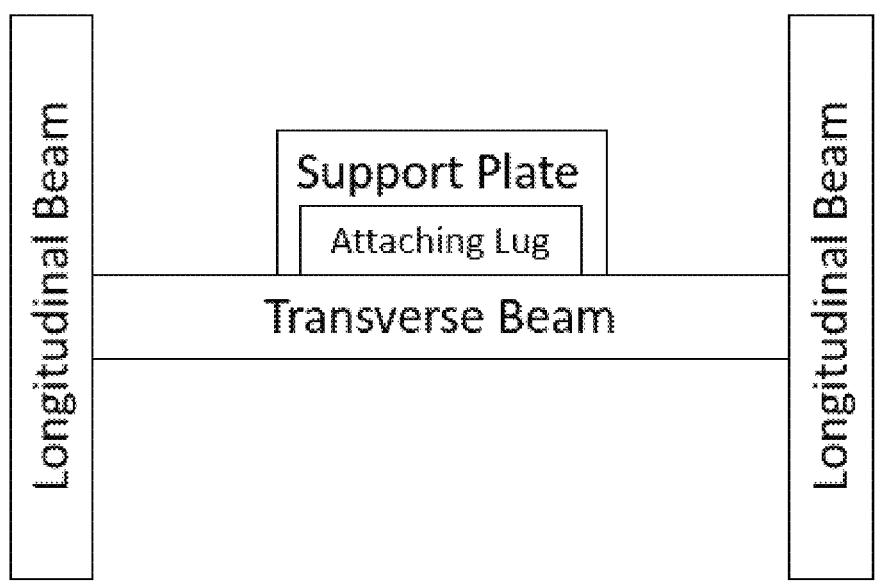
FIG. 4 schematically illustrates an embodiment in which exemplary link lugs and an exemplary support plate are welded to a transverse beam.

FIG. 2 and FIG. 3 in each case show (as viewed in the installed state in the vehicle) the left-hand vehicle side. It is provided, however, that the right-hand vehicle side has the same embodiment, and is therefore of substantially symmetrical configuration with respect to the left-hand vehicle side about a vehicle center axis.

Figure 1:
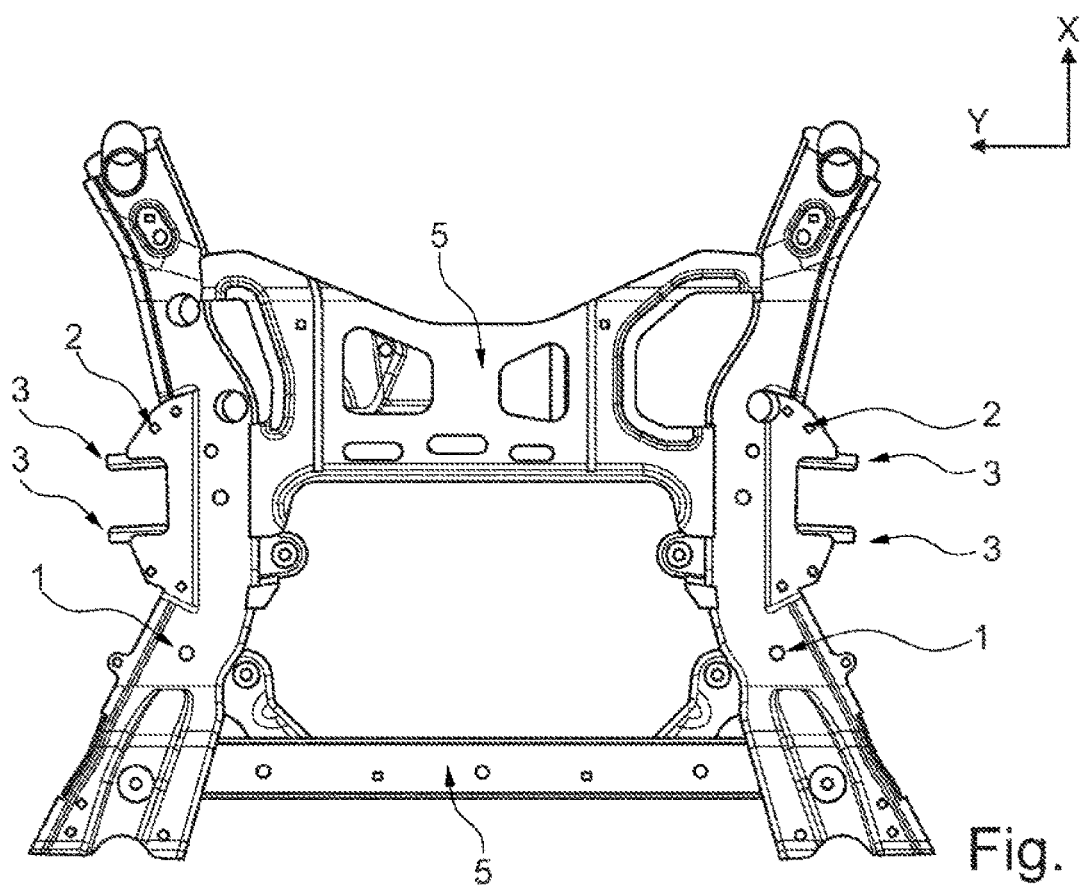
FIG. 1 shows a chassis subframe in a three-dimensional view from below.

An exemplary chassis subframe of one axle of a vehicle can be seen in FIG. 1. The chassis subframe has two longitudinal beams 1 (as viewed in the installed state in the vehicle) which are oriented substantially in the vehicle longitudinal direction X. Two transverse beams 5 in each case connect the two longitudinal beams 1 to one another and are oriented at least substantially in the vehicle transverse direction Y in the installed state in the vehicle.

As has already been stated, the chassis subframe or the longitudinal beams 1 of the chassis subframe are of substantially symmetrical configuration with respect to one another in relation to the vehicle center longitudinal axis in the installed state in the vehicle. All explanations made on the basis of one longitudinal beam 1 therefore also apply in mirror-inverted form to the other longitudinal beam 1.

It is provided (but cannot be seen in the figures) that a respective longitudinal beam is assembled in each case from an upper shell 1.1 and a lower shell 1.2 to form a hollow, tubular longitudinal beam. Here, the two shells are preferably welded to one another. Here, the two shells are produced by a sheet metal forming method.

The longitudinal beams in each case comprise two attaching lugs 3, by way of which a respective wheel controlling link (not depicted; in particular, a transverse link) connects a vehicle wheel (likewise not depicted) to the chassis subframe.

The attaching lugs 3 are arranged such that they are oriented or project from the longitudinal beam 1 in each case substantially in the vehicle transverse direction Y. A link can then be fastened between the two lugs 3 by means of a screw connection, for example.

Furthermore, a support plate 2 can be seen on each longitudinal beam 1 in FIG. 1. Here, the support plate 2 is produced in each case by the sheet metal forming method together with one of the two shells 1.1, 1.2 as a common component. In this specific case, the support plate 2 is produced with the lower shell 1.2 of the longitudinal beam 1.

The support plate 2 is of at least approximately flat and planar configuration, and is arranged so as to project from the longitudinal beam 1 at least substantially in the vehicle transverse direction Y in a horizontal plane.

As can be seen, in particular, in the detailed views in FIGS. 2 and 3, the attaching lugs 3 are connected in each case to the support plate 2. Furthermore, the attaching lugs 3 are connected to the longitudinal beam 1. In this specific case, these connections are realized by a welded connection which takes place by way of a plurality of weld seams 4.1, 4.2, 4.3, 4.4, 4.5. The weld seams are indicated diagrammatically by way of black bars.

It is provided here, in particular, that a respective attaching lug 3 (as can be seen in FIG. 3) is connected to the support plate 2 via weld seams 4.1, 4.3 which run substantially in the vehicle transverse direction Y.

It is provided, furthermore, that at least one attaching lug 3 is attached to the flat surface (oriented substantially in a horizontal plane) of the upper shell 1.1 of the longitudinal beam 1. Here, this attachment takes place by way of a weld seam 4.4 which is oriented at least approximately in the vehicle transverse direction Y. As has already been stated, the orientation of the weld seams in the vehicle transverse direction and a configuration of the weld seams on a surface of the shells which extends as far as possible in the horizontal plane enable an optimized force flow during the introduction of the link forces and an increased service life of the link attachment and the chassis subframe itself.

In addition to the indicated weld seams, the lugs 3 can be connected to the longitudinal beam by way of further weld seams 4.5, 4.2.

The support plate 2 serves, in particular, as a reinforcement for the link attachment. The wheel controlling link is then preferably screwed to the two attaching lugs 3 in the vehicle longitudinal direction X. To this end, furthermore, a recess is provided in the support plate 2, into which recess a link can be guided.

The invention claimed is:

1. A chassis subframe of a two-track vehicle, comprising:
at least two tubular longitudinal beams which are oriented at least approximately in a vehicle longitudinal direction;
wherein the at least two longitudinal beams in each case comprise an upper shell and a lower shell, and the upper shell and the lower shell are produced by a sheet metal forming method and are joined by way of a joining method;
at least one transverse beam which is oriented at least approximately in a vehicle transverse direction and connects the two longitudinal beams to one another;
wherein one of the lower shell or the upper shell of a respective longitudinal beam comprises a support plate which is produced during the sheet metal forming method as a constituent part of the lower shell or the upper shell of the respective longitudinal beam,
wherein the support plate is arranged so as to project from the respective longitudinal beam at least approximately in a horizontal plane and at least approximately in the vehicle transverse direction; and
at least one part of a respective attaching lug is welded to the support plate by a weld seam running at least approximately in the vehicle transverse direction, wherein at least one wheel controlling link is attachable by way of the respective attaching lug for connecting a wheel of the vehicle to the chassis subframe;
wherein at least one further part of the attaching lug is directly connected to a surface of the other of the upper shell or the lower shell of the longitudinal beam via a weld seam.

2. The chassis subframe according to claim 1, comprising:
two attaching lugs, the two attaching lugs being spaced apart from one another in the vehicle longitudinal direction and projecting in each case from one longitudinal beam at least approximately in the vehicle transverse direction, whereby a vehicle-side end of the controlling link is arrangeable between the two attaching lugs.

3. The chassis subframe according to claim 1, wherein the attaching lug comprises at least two wing elements which are spaced apart from one another in the vehicle longitudinal direction and are oriented at least approximately in the vehicle transverse direction, whereby a vehicle-side end of the controlling link is arrangeable between the two wing elements.

4. The chassis subframe according to claim 1, wherein the at least one part of the attaching lug, which at least one part is welded to the support plate, lies on the support plate.

5. The chassis subframe according to claim 1, wherein the support plate comprises a recess, in which a link is arranged.

6. A vehicle comprising at least one chassis subframe according to claim 1.

7. The chassis subframe according to claim 1, wherein the support plate extends from a horizontal surface of the lower shell or the upper shell.

8. The chassis subframe according to claim 1, wherein the least one further part of the attaching lug is connected to a horizontal surface of the other of the upper shell or the lower shell of the longitudinal beam via a weld seam.

9. The chassis subframe according to claim 1, wherein the at least one further part of the attaching lug is connected to a horizontal surface of the other of the upper shell or the lower shell of the longitudinal beam via a weld seam which runs at least approximately in the vehicle transverse direction.

10. The chassis subframe according to claim 1, further comprising at least one weld seam running at least approximately in the vehicle vertical direction attaching a second further part of the attaching lug to a vertical surface of the longitudinal beam.

11. A chassis subframe of a two-track vehicle, comprising:
at least two tubular longitudinal beams which are oriented at least approximately in a vehicle longitudinal direction;
a transverse beam which is oriented at least approximately in a vehicle transverse direction and connects the two longitudinal beams to one another, wherein the transverse beam comprises an upper shell and a lower shell produced by a sheet metal forming method and are joined by way of a joining method,
wherein one of the lower shell or the upper shell of the transverse beam comprises a support plate which is produced during the sheet metal forming method as a constituent part of the lower shell or the upper shell of the traverse beam,
wherein the support plate is arranged so as to project from the transverse beam at least approximately in a horizontal plane and at least approximately in a vehicle longitudinal direction; and at least one part of an attaching lug is welded to the support plate by a weld seam running at least approximately in the vehicle longitudinal direction, wherein a wheel controlling link, a tension strut and/or a compression strut is attachable by way of the attaching lug to the transverse beam for connecting a wheel, and/or a drive unit of the vehicle to the chassis subframe;

wherein at least one further part of the attaching lug is directly connected to a surface of the other of the upper shell or the lower shell of the transverse beam via a weld seam.

12. The chassis subframe according to claim 11, wherein the support plate extends from a horizontal surface of the lower shell or the upper shell.

13. A vehicle comprising at least one chassis subframe according to claim 11.

14. The chassis subframe according to claim 11, wherein the least one further part of the attaching lug is connected to a horizontal surface of the other of the upper shell or the lower shell of the transverse beam via a weld seam.

15. The chassis subframe according to claim 11, wherein the at least one further part of the attaching lug is connected to a horizontal surface of the other of the upper shell or the lower shell of the transverse beam via a weld seam which runs at least approximately in the vehicle longitudinal direction.

16. The chassis subframe according to claim 11, further comprising at least one weld seam running at least approximately in the vehicle vertical direction attaching a second further part of the attaching lug to a vertical surface of the transverse beam.

* * * * *